United States Patent

[11] 3,586,979

| [72] | Inventors | Harold R. Hine<br>1325 Ottaburn Ave., Vancouver;<br>Edward F. Dawson, 3085 Comox Ave.,<br>Comox, both of, Canada |
|---|---|---|
| [21] | Appl. No. | 773,917 |
| [22] | Filed | Nov. 6, 1968 |
| [45] | Patented | June 22, 1971 |

[54] CRAFT POSITION INDICATING APPARATUS
15 Claims, 7 Drawing Figs.

[52] U.S. Cl. .................................................. 325/115,
325/111
[51] Int. Cl. .................................................. H04b 1/02
[50] Field of Search .................................... 325/112,
115, 114, 116; 343/705

[56] References Cited
UNITED STATES PATENTS

| 2,149,808 | 3/1939 | Ellis | 325/115 |
| 2,519,553 | 8/1950 | Faulkner | 325/114 |
| 2,593,432 | 4/1952 | Freas | 325/112 |
| 3,335,371 | 8/1967 | Yandell | 325/115 |

Primary Examiner—Robert L. Richardson
Assistant Examiner—R. S. Bell
Attorney—Fetherstonhaugh & Co.

ABSTRACT: Apparatus for indicating the position of a craft that has crashed and including a main electrical circuit with a battery and a normally inoperative radio signal transmitter therein with switching means connected in this circuit operable to cause the transmitter to transmit radio signals, and control means in the form of a fragile electrical conductor or a fragile tube containing fluid under pressure, to be extended throughout the craft where the control means will be interrupted if the craft crashes. The control means is connected to the switching means to operate the latter when the control means is interrupted as a result of the crash.

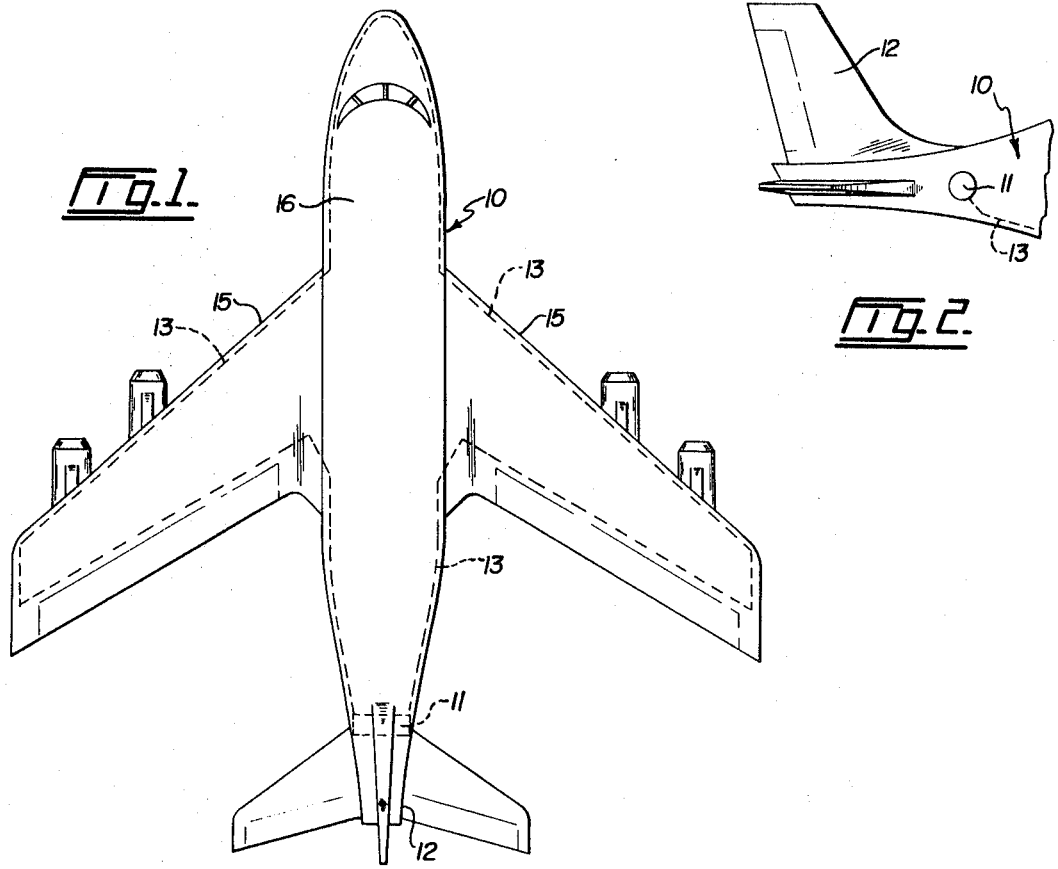
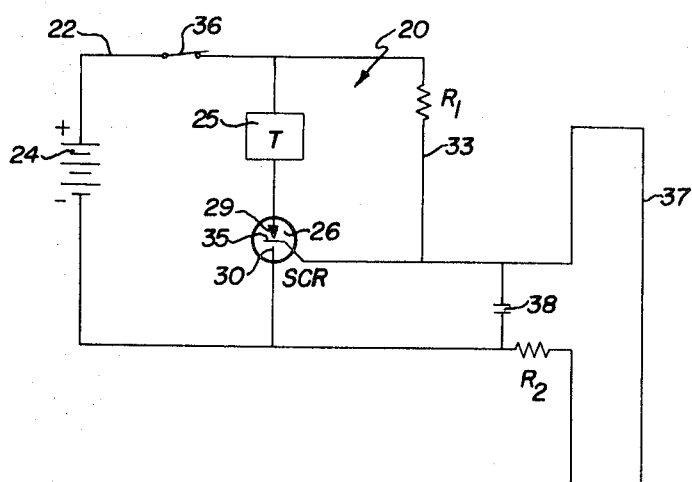

CRAFT POSITION INDICATING APPARATUS

BACKGROUND OF THE INVENTION

This invention relates to apparatus for indicating the position of a craft, such as an aircraft, boat or the like, that has crashed either on land or in water.

Numerous attempts have been made to provide apparatus for indicating the position of a craft, such as an airplane, that has crashed, but these have not been very acceptable. Some of these must be thrown clear of the craft before they will start to operate, others are supposed to operate on impact, but the latter, in order to make them safe, will not operate unless the craft is subjected to extensive damage, and some can only be operated by a survivor. It is significant that in spite of the fact that devices for sending out homing signals have been known for a number of years, these are not being used in aircraft. The only unit generally available today for small aircraft is known as "SARAH." However, this is a unit that must be set up and put into operation by a survivor. As a result, even today, when a plane crashed without its location being known, searchers in rescue aircraft have to fly over the area in which the crashed craft is believed to be in the hope of being able to see the craft or some signals by the survivors. If there are no survivors or if these are injured, the only hope of finding them is by sight, and this is very difficult in mountainous, wooded or snow country. There have been many instances of survivors not being located for days, weeks or even months after a crash.

SUMMARY OF THE INVENTION

The main purpose of this invention is to provide very simple apparatus to be mounted in a craft, such as an aircraft, which, if the craft is subjected to even slight damage, of if it is subjected to heavy damage, will automatically start to transmit radio signals so that searchers for the craft will be able quickly and easily to locate it.

Craft position-indicating apparatus according to the present invention includes a radio signal transmitter and a battery in series in a main electrical circuit, said transmitter normally being inoperative in the circuit. Switching means is connected in the main circuit and is operable to cause the transmitter to transmit radio signals. This switching means may be a silicon-controlled rectifier, a relay switch, or the like. Control means is provided for the switching means. This control means is preferably adapted to be extended throughout the craft, and/or particularly in areas thereof that are liable to be smashed during a crash. In some embodiments of the invention this control means is in the form of a fragile electrical conductor that may be inside or along the outer surface of different parts of the craft, while in other embodiments of the invention, the control means is in the form of a fragile tube containing fluid under pressure. In any case, if the control means is interrupted by a crash or the like, the switching means is operated to cause the transmitter to transmit radio signals.

It is preferable to locate this positon-indicating apparatus somewhere around the tail assembly of the aircraft since these assemblies usually remain in fair condition after crashes. The apparatus may be mounted in any suitable manner to withstand the action of the crash. The transmitter will be operated if a fire starts since the control means will be interrupted by the heat or flames. Alternatively, the apparatus can be made in a compact unit which will be ejected from the craft in the event of the latter crashing or landing on water and starting to sink.

BRIEF DESCRIPTION OF THE DRAWINGS

FIG. 1 is a diagrammatic plan view of an aircraft with the present position-indicating apparatus mounted in it, FIG. 2 is a diagrammatic side elevation of the tail portion of the aircraft, FIG. 3 diagrammatically illustrates a preferred form of the position-indicating apparatus, FIG. 4 diagrammatically illustrates an alternative form of this apparatus, FIG. 5 diagrammatically illustrates another alternative form of the apparatus, FIG. 6 diagrammatically illustrates yet another alternative form of the apparatus, and FIG. 7 diagrammatically illustrates a unit incorporating this invention and mounted so as to be ejected if the craft is immersed in water.

DESCRIPTION OF THE PREFERRED EMBODIMENTS

Figure 4:
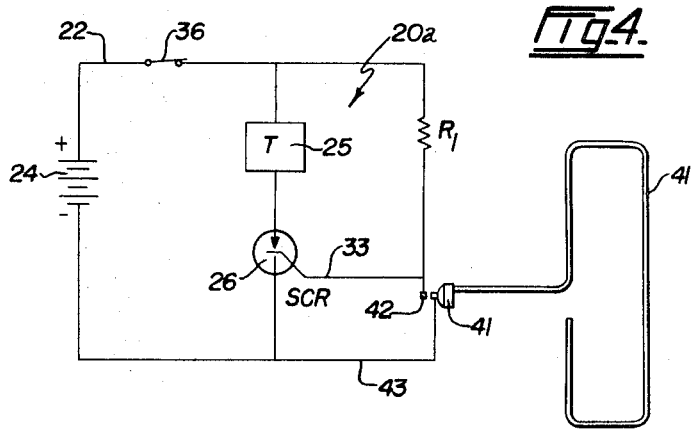

Referring to FIGS. 1 and 2 of the drawings, 10 is an aircraft having craft position-indicating apparatus 11 mounted therein in any suitable position, and preferably near the tail assembly 12 thereof since this area usually is subjected to the least damage when the craft crashes. The apparatus 11 includes control means 13 which extends throughout the craft, and particularly in areas that are most likely to be damaged if the craft crashes. In this example, the control means 13 extends along the leading edges 15 of the wings of the craft, and along various portions of the fuselage 16. The control means also extends along the lower surface of the fuselage inside and/or on the outer surface thereof. This control means is such that an interruption or break therein will cause apparatus 11 to operate to send out a radio signal which may be picked up by searching aircraft to lead them to the position of the crash.

FIG. 3 diagrammatically illustrates a preferred form of position-indicating apparatus 20. This apparatus includes a main circuit 22 connecting in series battery 24, radio transmitter 25 and suitable switching means which, in this example, is a silicon-controlled rectifier 26. The anode 29 of this SCR is connected through transmitter 25 to the positive terminal of battery 24, whereas the cathode 30 of the SCR is connected to the negative terminal of said battery. With this arrangement, battery 24 is the power source for the transmitter. A gate circuit 33 connects the gate 35 of the SCR through resistor $R_1$ to the positive terminal of the battery. A main switch 36 is provided in circuit 22, said switch being closed when it is desired to set up the apparatus so that it will start to function if the craft crashes.

The control means for apparatus 20 is a fragile electrical conductor 37 which is connected at one end to gate circuit 33 and at its other end to the negative terminal of battery 24 through resistor $R_2$. This conductor may be formed of any suitable conducting material that will stand normal handling but which will fracture very easily if the part of the craft to which it is attached is damaged. For example, this conductor may be in the form of a thin, metal foil strip which is applied to various surfaces of the craft which are liable to be damaged if the craft crashes. The apparatus is improved if a condenser 38 is connected across the loop formed by conductor 37 and between resistor $R_2$ and the negative terminal of the battery.

Switch 36 of apparatus 20 is closed prior to the takeoff of the aircraft so that the apparatus is ready for operation should a crash occur. As conductor 37 is connected to the negative terminal of battery 24, gate 35 of the SCR is kept in a negative condition, at which time no current can travel through the SCR so that transmitter 25 is off. If conductor 37 is interrupted or broken, a slight positive charge is fed through resistor $R_1$ to gate 35 of the SCR. This turns the SCR on, allowing current to flow through the transmitter, and the SCR remains in this condition regardless of the gate polarity as long as a minimum current flows through the transmitter and the SCR. When the transmitter is turned on, it sends out a radio signal. As equipment of this type is well known in the industry, is is not necessary to describe this transmitter and its operation. Condenser 38 normally has no charge on it since resistor $R_2$ and fragile conductor 37 short it out. However, when this conductor is broken, the plate of the condenser which is connected to the negative terminal of the battery takes on a negative charge and induces a positive charge on the other plate of the condenser through resistor $R_1$ from the positive terminal of the battery, and the condenser discharges through gate 35 of the SCR, enhancing its turn-on ability. Resistor $R_2$, being in series with conductor 37 and resistor $R_1$, reduces gate current leakage from the battery, across which said conductor and resistor are directly connected when the transmitter is off.

There are a number of known circuits utilizing semiconductors that could be used in conjunction with apparatus 20 which would prolong the life of battery 24 after signal transmission has begun. Among these are low frequency oscillator and flip-flop circuits which would time transmitter on and off periods, so that an intermittent signal would be sent. A decoder in the transmitter could hold it in the "off" condition until a search aircraft carrying a corresponding coder came within range of the decoder to start the operation of the transmitter. As the equipment of these variations is well known, there is no need to describe it herein.

FIG. 4 diagrammatically illustrates apparatus 20a which is similar to apparatus 20, excepting that the control means is different. In this example, the control means is in the form of a fragile thin tube 40 which extends throughout the aircraft instead of the electrical conductor 37. Tube 40 contains a fluid under pressure, and has an end connected to a fluid-operated switch 41 with normally closed contacts 42 in a circuit 43 connecting gate circuit 33 to the negative terminal of the battery.

As the pressure-operated switch 41 is normally closed, the gate of SCR 26 is normally maintained in a negative condition. If tube 40 is interrupted or broken, the pressure of the fluid therein is released so that switch 41 opens contacts 42, thereby allowing a positive charge to be fed to the gate of the SCR. The operation of apparatus 20a is now the same as apparatus 20.

Figure 5:
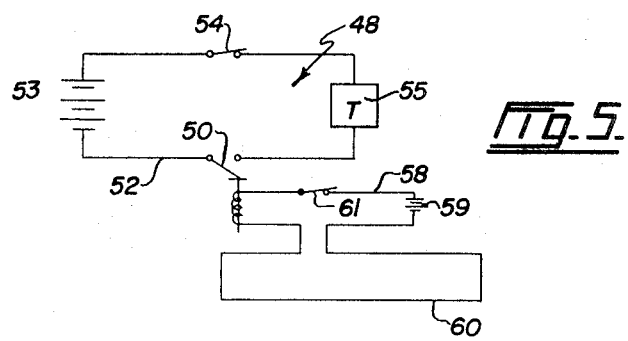

FIG. 5 diagrammatically illustrates position-indicating apparatus 48 having control means in the form of a relay switch 50. This switch is normally open, and it is in a main circuit 52 including therewith battery 53, main switch 54 and radio transmitter 55. The solenoid of switch 50 is connected in series in a circuit 58 with a battery 59. Control means in the form of a fragile electrical conductor 60 is connected to circuit 58 in series with the battery and the relay switch. Circuit 58 also includes a control switch 61.

Switches 54 and 61 are closed to put apparatus 48 in condition for operation should the aircraft crash. Battery 59 energizes the solenoid of relay switch 50 to keep the latter open so that transmitter 55 is retained inoperative. If conductor 60 is interrupted or broken, the solenoid of switch 50 is deenergized so that said switch is closed, thereby causing transmitter 55 to send out radio signals.

Figure 6:
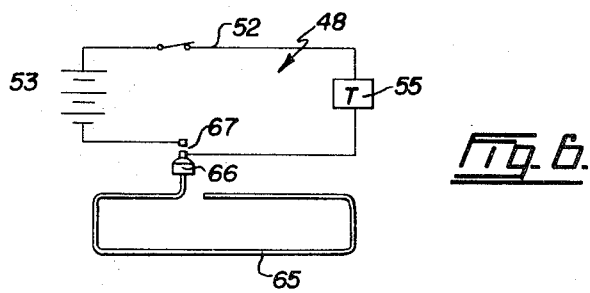

FIG. 6 diagrammatically illustrates apparatus 48a which is similar to apparatus 48, excepting that the conductor 60 is replaced by a fragile tube 56 having fluid under pressure therein, and connected to a fluid-operated switch 66 which normally keeps the contacts of switching means in the form of switch 67 open, said contacts forming part of main circuit 52. If tube 65 is interrupted or broken, the pressure of the fluid therein is lost and switch 66 operates to close the contacts of switch 67, at which time transmitter 55 starts to operate.

Figure 7:
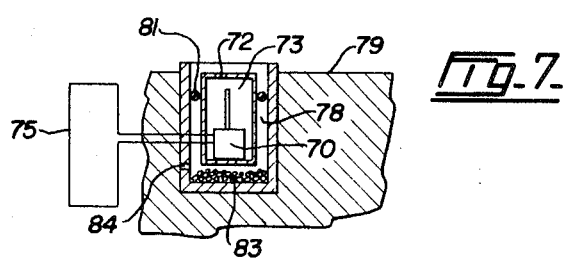

FIG. 7 illustrates position-indicating apparatus 70, which may be any of the above-described embodiments of the apparatus, sealed in a container 72 having a buoyancy chamber 73 therein. Apparatus 70 includes a fragile conductor loop 75 extending throughout the craft, although this might be a fragile tube of the type described above. Container 72 is normally positioned in a chamber 78 which opens out from the side 79 of the craft in which the apparatus is located. A seal 81 is positioned between container 72 and the walls of chamber 78, and a suitable substance 83, such as carbide, provided in the bottom of this chamber, said substance being adapted to generate a gas when exposed to water. A water inlet 84 is provided in the wall of chamber 78.

If the craft in which the apparatus 70 of FIG. 7 is mounted crashes on water or on land, the position-indicating apparatus will operate in the manner described above as a result of conductor 75 being interrupted or broken. However, if the craft lands on water without damage and then starts to sink, when water enters chamber 78 through inlet 84, the substance 83 will generate a gas which, when the pressure is great enough, will eject container 73 from the chamber. chamber. This will in effect break conductor 75 so that the transmitter of unit 70 will start to transmit its signal as the container 72 floats in the water.

We claim:

1. Apparatus for indicating the position of a craft that has crashed, comprising a main electrical circuit including a battery and a radio signal transmitter in series, said transmitter normally being inoperative in the circuit, switching means connected in said circuit operable to cause the transmitter to transmit radio signals, and fragile control means to be mounted on the craft and extending over a large area thereof where said control means will be ruptured if the craft crashes, said control means being connected to said switching means and adapted to operate said switching means solely by the rupture of the control means.

2. Craft-indicating apparatus as claimed in claim 1 in which said control means comprises a fragile electrical conductor which will break if a part of the craft along which said conductor extends is subjected to extraordinary force.

3. Craft-indicating apparatus as claimed in claim 1 in which said switching means comprises a silicon-controlled rectifier normally keeping the main circuit open.

4. Craft-indicating apparatus as claimed in claim 1 in which said switching means comprises a silicon-controlled rectifier normally keeping the main circuit open, the anode and the cathode of said SCR being connected in the main circuit, and a gate circuit connecting the gate of the SCR through a biasing resistor to the positive terminal of said battery, said control means being connected to said gate circuit so that when said control means is interrupted a positive charge is fed to said gate, thereby allowing current to flow in said main circuit to operate the transmitter.

5. Craft-indicating apparatus as claimed in claim 4 in which said control means comprises a fragile electrical conductor which will break if a part of the craft along which said conductor extends is subjected to extraordinary force, said conductor connecting said gate to the negative terminal of the battery so that when said conductor breaks a positive change is fed to said gate, thereby allowing current to flow in said main circuit to operate the transmitter.

6. Craft-indicating apparatus as claimed in claim 5 in which said conductor includes a resistance therein.

7. Craft-indicating apparatus as claimed in claim 5 including a condenser operatively connected to said gate and the negative terminal of the battery.

8. Craft-indicating apparatus as claimed in claim 4 in which said control means comprises a fluid-operated switch operable to cause said SCR to conduct, a fragile tube connected to said switch and which will break if a part of the craft along which said tube extends is subjected to extraordinary force, and a fluid in the tube under pressure, whereby breakage of said tube operates the fluid-operated switch to allow current to flow in said main circuit to operate the transmitter.

9. Craft-indicating apparatus as claimed in claim 4 in which said control means comprises a normally open fluid-operated switch in said gate circuit, a fragile tube connected to said switch and which will beak if a part of the craft along which said tube extends is subjected to extraordinary force, and a fluid in the tube under pressure, whereby breakage of said tube closes said switch to cause a positive charge to be fed to said gate, thereby allowing current to flow in said main circuit to operate the transmitter.

10. Craft-indicating apparatus as claimed in claim 1 in which said control means comprises a switch in the main circuit, a relay normally keeping said switch open, a battery in circuit with said relay, a fragile means extending throughout the craft and normally controlling the relay to keep said switch open, said fragile means on being disrupted causing the relay to operate to close switch.

11. Craft-indicating apparatus as claimed in claim 10 in which said fragile means comprises a fragile electrical conductor extending throughout the craft and in series with said battery and relay and which will break if a part of the craft along which said conductor extends is subjected to extraordinary force.

12. Craft-indicating apparatus as claimed in claim 10 including a fluid-operated switch in series with said battery and relay, and in which said fragile means comprises a fragile tube extending throughout the craft and connected to said switch and which will break if a part of the craft along which said tube extends is subjected to extraordinary force, and a fluid in the tube under pressure, whereby breakage of said tube operates the fluid-operated switch.

13. Craft-indicating apparatus as claimed in claim 1 in which said switching means comprises a silicon-controlled rectifier normally keeping the main circuit open, the anode and the cathode of said SCR being connected to the main circuit, and a gate circuit connecting the gate of the SCR through a biasing resistor to the positive terminal of said battery, and said control means comprising a fluid-operated switch operable to cause said SCR to conduct, a fragile container connected by a tube to said switch and which will break if the part of the craft on which the container is mounted is subjected to extraordinary force, and a fluid in the container under pressure, whereby breakage of the container operates the fluid-operated switch to allow current to flow in said main circuit to operate the transmitter.

14. Craft-indicating apparatus as claimed in claim 1 in which said control means comprises a fluid-operated switch in the main circuit in series with said battery and transmitter, and a fluid under pressure in said fragile means, said fragile means being operatively connected to said switch, whereby breakage of said fragile means operates said fluid-operated switch.

15. Craft-indicating apparatus as claimed in claim 14 in which said fragile means comprises a fragile tube extending throughout the craft and containing said fluid under pressure and operatively connected to said switch.